United States Patent
Fuller et al.

(10) Patent No.: US 6,708,233 B1
(45) Date of Patent: Mar. 16, 2004

(54) METHOD AND APPARATUS FOR DIRECT BUFFERING OF A STREAM OF VARIABLE-LENGTH DATA

(75) Inventors: John Nels Fuller, Redmond, WA (US); Georgios Chrysanthakopoulos, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/495,755

(22) Filed: Feb. 1, 2000

Related U.S. Application Data

(60) Provisional application No. 60/126,098, filed on Mar. 25, 1999.

(51) Int. Cl.[7] .............................................. G06F 13/00
(52) U.S. Cl. ................................. 710/22; 710/52
(58) Field of Search ...................... 710/305, 4, 20–35, 710/52–56; 709/231–232, 236; 370/389, 466

(56) References Cited

U.S. PATENT DOCUMENTS

| | | | | |
|---|---|---|---|---|
| 5,632,016 A | * | 5/1997 | Hoch et al. .................... | 710/30 |
| 5,815,678 A | * | 9/1998 | Hoffman et al. ............ | 710/305 |
| 5,828,903 A | * | 10/1998 | Sethuram et al. ............. | 710/53 |
| 5,845,152 A | * | 12/1998 | Anderson et al. ............. | 710/52 |
| 6,032,190 A | * | 2/2000 | Bremer et al. ............... | 709/238 |
| 6,243,395 B1 | * | 6/2001 | Fujimori et al. ............ | 370/466 |
| 6,279,051 B1 | * | 8/2001 | Gates et al. .................... | 710/20 |
| 6,363,428 B1 | * | 3/2002 | Chou et al. .................. | 709/232 |
| 6,532,232 B1 | * | 3/2003 | Goodwin, III .............. | 370/389 |

OTHER PUBLICATIONS

"IBM 1394 Developers Kit—Enables 400 Mb/s PCT-to-1394 Performance", IBM Microelectronics, Oct. 1997.

"1394 Host Link Layer Controller Enables IEEE 1394 Standard PCI Performance", IBM Microelectronics, Oct. 1997.

"TSB12LV23: Enhancements for Improved DV Performance", Texas Instruments Internal Data, Revision 1.0—Jan. 26, 1999.

"1394 Serial Bus Link Layer PCI Controller", IBM Document 1998.

* cited by examiner

Primary Examiner—Christopher B. Shin
(74) Attorney, Agent, or Firm—Banner & Witcoff, Ltd.

(57) ABSTRACT

A method and apparatus for directly creating a buffer of contiguous payload data from an incoming variable-length data stream utilizes a host controller for providing direct memory access (DMA) to a host computer memory. Payload data and header data from the data stream are stored contiguously in separate buffers in host memory. DMA descriptors, through appropriate software drivers, instruct the DMA engine of host controller to separate payload data and header data of each incoming packet on the data stream and place it in respective buffers in host memory. Thus, two separate logical buffers may be directly created from a single incoming logical variable-length data stream. Payload data is written directly and contiguously to host memory without the need for memory copies and the associated use of main processor resources.

22 Claims, 4 Drawing Sheets

METHOD AND APPARATUS FOR DIRECT BUFFERING OF A STREAM OF VARIABLE-LENGTH DATA

This application claims the benefit of provisional application No. 60/126,098 filed Mar. 25, 1999.

TECHNICAL FIELD

The invention relates to serial communications and direct memory access between digital devices, including digital audio and video devices and digital computers. More particularly, the invention relates to method and apparatus for buffering header and payload data from an incoming data stream. The invention also relates to a data structure defining direct memory access descriptors for a hardware direct memory access controller.

BACKGROUND OF THE INVENTION

Digital hardware devices, such as Digital Versatile Disk (DVD) players, digital video cameras and digital audio devices are capable of generating vast amounts of digital data at high speeds. Often, such devices are used in conjunction with multimedia features of digital computers and are configured to transfer digital data on a serial bus to a host computer executing appropriate applications to render the digital data to a user.

Most state-of-the-art digital systems utilize Direct Memory Access (DMA) provided on the host computer to receive an incoming data stream directly into host memory. DMA techniques employ computer bus architectures that allow data to be sent directly to the host memory on the computer's motherboard and therefore offer the advantage of eliminating the host computer main processor's involvement in the data transfer and eliminating the additional memory bandwidth needed to move data from one buffer to another, thus speeding overall computer operation.

To foster smooth, continuous rendering of video or audio data, transfer of such data on serial buses usually occurs according to an isochronous protocol. Isochronous data transfer ensures that data flows at a pre-set rate so that applications being executed on the host computer are able to accomplish continuous rendering of audio or video images, without interruption, enhancing the user's experience of the incoming data. Isochronous data transfer typically involves the use of packets which contain a header of fixed size and payload data, which is of variable length. Header data is used for error-checking and general "housekeeping" functions, while the payload data represents the actual data, usually in a compressed or encoded format, that is to be rendered on the host computer.

Before incoming isochronous data can be decoded and utilized by a rendering application on the host computer, the payload data must be stored in a contiguous fashion in host memory. "Contiguous" as used herein means that the payload data stored in host memory represents a continuous stream of input data to a rendering application, without requiring removal of intermediate artifacts or information between the payload data corresponding to separate, consecutive packets. Thus, the header data in each packet of the incoming data stream must be separated from the respective payload data in that packet.

Conventional buffering schemes accomplish this by creating memory copies of the incoming data. Using a DMA channel, the incoming header and payload data are written directly into host memory as a large block of payload data with header data interspersed throughout. Before rendering by an application can occur, the payload data must be parsed through by an application. Parsing typically involves utilizing the main processor to copy payload data into a second buffer, discarding the header data.

Unfortunately, parsing requires main processing resources of the host computer. Moreover, this use of main processing resources is significant because of the vast amount of data that must be parsed. Since a high-speed serial bus, like the IEEE 1394 High Performance Serial Bus, is capable of data transfer speeds up to 400 Mbps (megabits per second) and therefore may transfer isochronous data into host memory at increased rates of speed, the drain on processor resources may become an obstacle to improving the user's experience of incoming digital audio and video data. It would therefore be advantageous to provide a method and apparatus for utilizing DMA to directly create a buffer of contiguous payload data from an incoming data stream, without resort to the memory copy techniques of the prior art.

SUMMARY OF THE INVENTION

The aforementioned problems are addressed by the invention, which provides a method and apparatus for directly creating a buffer of contiguous payload data from an incoming data stream. In an exemplary system, the invention provides a control program for a host controller complying with the IEEE Open Host Controller Interface 1394 Specification, Release 1.00 (OHCI 1394). The control program is implemented in the form of a novel IEEE 1394-compliant descriptor. The DMA descriptors, through appropriate software drivers, instruct the DMA engine of host controller to separate payload data and header data of each incoming packet on the isochronous stream and place it in respective buffers in host memory. Thus, two separate logical buffers may be directly created from a single incoming logical variable-length data stream.

An exemplary descriptor according to the invention includes an 8-quadlet format with respective fields for information describing the starting memory address of the header buffer and the starting memory address of the data buffer. The exemplary descriptor also includes fields representing the fixed size of the packet header data, number of bytes of header data to be stored in the header buffer, number of bytes of payload data to be stored in the payload data buffer, residual bytes left in the header buffer, residual bytes left in the payload data buffer, and a branch address to the next descriptor.

According to an exemplary process, a DMA engine configured in the host controller fetches the appropriate descriptor block when a packet in the particular DMA context arrives on the serial bus. The header data is written to the header buffer defined by the header buffer starting address and the data representing the residual header buffer size is updated. Similarly, if payload data accompanies the header, payload data is written to the data buffer defined by the data buffer starting address and the data representing the residual data buffer size is updated. If the payload data in the packet is larger than the residual data buffer size, the payload data is continued in the buffer defined by the next descriptor located at the branch address in the first descriptor.

Since the hardware controller writes the payload data in contiguous fashion, without header data, directly into the payload data buffer, the memory copy and parsing steps of the prior art are eliminated. Moreover, since header data is also written directly into the header data buffer in concatenated fashion, there is a one-to-one correspondence between the header data in the header data buffer and the payload data in the payload data buffer. This structure permits error recovery and other "housekeeping" functions to be maintained, even though the header data is stored in a separate buffer.

An additional advantage provided by an exemplary buffering scheme according to the invention permits control of the maximum amount of data (frame data in the case of digital video) stored in particular payload data buffers. By selecting a particular header buffer size, an application may provide for branching to a next DMA descriptor when the header buffer is full. Thus, if an application developer desires, for example, no more than a 50 millisecond length of frame data to be stored in each payload data buffer, the developer may specify a payload buffer size that would accommodate the maximum amount of payload data that would correspond to 50 milliseconds of frame data and specify a header buffer size that is just large enough to accommodate the number of headers that correspond to 50 milliseconds of data. The buffering scheme may be configured to branch to the next descriptor when the header buffer fills up, thus beginning a new header buffer and payload data buffer and thus controlling the maximum amount of data that can be contained in each payload data buffer.

Still another advantage provided by the invention is the ability provide a very large contiguous buffer of payload data in order to view a long stream of digital video data, for example. To accomplish this, an application may provide for a very large data buffer size (100 pages, each one of 4K of memory, for a total of 400K, for example) in the DMA descriptor. The header buffer size is also selected to be sufficient to accommodate all headers that would correspond to the payload data in a full data buffer. Thus, the header buffer is never completely full, while the data buffer size is very large. This provides the capability to periodically observe header data to provide notifications while the data stream is progressing. These notifications are interrupt events signaled by the DMA engine to the host processor when the DMA engine moves from one control descriptor to the next.

Thus, the invention provides for the use of stored buffer data by applications according to two different models. In one model, an application may process the buffer data as representing a fixed amount of time regardless of the actual data count. In the other model, an application may process the buffer data as representing a fixed amount of data regardless of the actual time, i.e., video play time, represented by that data.

BRIEF DESCRIPTION OF THE DRAWINGS

The present invention is illustrated by way of example in the accompanying Figures, which should not be construed as limiting, in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
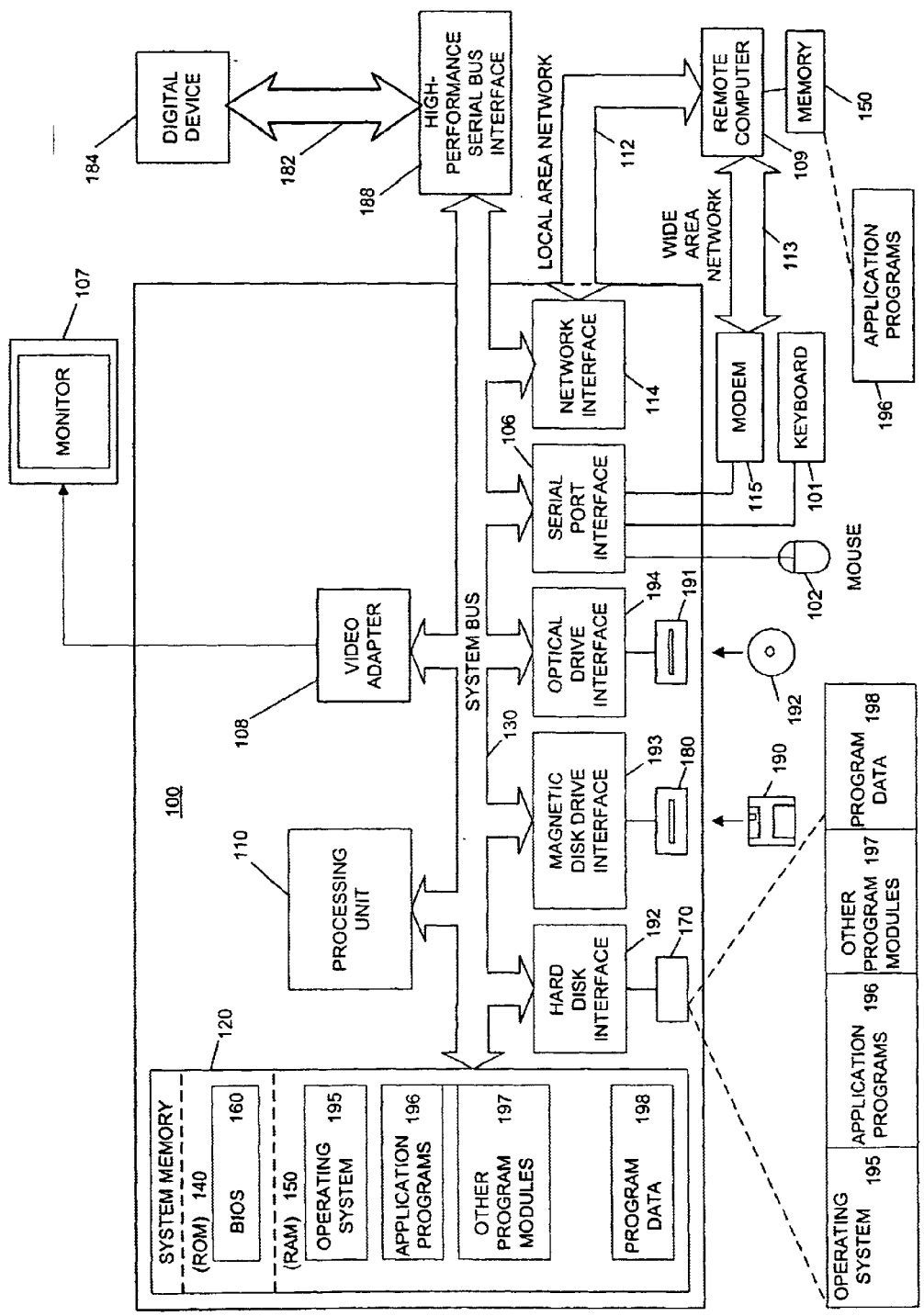
FIG. 1 is a schematic block diagram of a general-purpose digital computing environment that may be used to implement various aspects of the present invention.

FIG. 1 is a schematic diagram of a conventional general-purpose digital computing environment that can be used to implement various aspects of the invention. FIG. 1 and the following discussion are intended to provide a brief, general description of a suitable computing environment in which the invention may be implemented.

With reference to FIG. 1, an exemplary system for implementing the invention includes a general purpose computing device in the form of a conventional personal computer 100, having a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150. A basic input/output system 160 (BIOS), containing the basic routines that helps to transfer information between elements within the personal computer 100, such as during start-up, is stored in ROM 140.

The personal computer 100 further includes a hard disk drive 170 for reading from and writing to a hard disk (not shown). Also included are a magnetic disk drive 180 for reading from or writing to a removable magnetic disk 180, and an optical disk drive 191 for reading from or writing to a removable optical disk 192 such as a CD-ROM or other optical media. The hard disk drive 170, magnetic disk drive 180, and optical disk drive 191 are connected to the system bus 130 by a hard disk drive interface 192, a magnetic disk drive interface 193, and an optical drive interface 194, respectively. The drives and their associated computer-readable media provide nonvolatile storage of computer readable instructions, data structures, program modules and other data for the personal computer 100. Although the exemplary environment described herein employs a hard disk 170, a removable magnetic disk 190 and a removable optical disk 192, it should be appreciated by those skilled in the art that other types of computer-readable media are contemplated by the invention. For example, media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 190, optical disk 192, ROM 140 or RAM 150, including an operating system 195, one or more application programs 196, other program modules 197, and program data 198. A user may enter commands and information into the personal computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor and speakers, personal computers typically include other peripheral output devices (not shown), such as printers.

The personal computer 100 may operate in a networked environment using logical connections to one or more remote computers, such as remote computer 109. Each remote computer 109 may be another personal computer, a server, a router, a network PC, a peer device or other common network node, and typically includes many or all of the elements described above relative to the personal computer 100, although only a memory storage device 150 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the personal computer 100 is connected to the local area network 112 through a network interface or adapter 114. When used in a WAN networking environment, the personal computer 100 typically includes a modem 115 or other means for establishing communications over WAN 113. The modem 115, which may be internal or external, is connected to the system bus 130 via the serial port interface 106. In a networked environment, program modules depicted relative to the personal computer 100, or portions thereof, may be stored in the remote memory storage device. It will be appreciated that the network connections shown are exemplary and other means of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

System bus 130 communicates with a high-performance serial bus interface 188 which, in turn, communicates with a high-performance serial bus 182, such as a bus adhering to the IEEE 1394 High Performance Serial Bus standard, Version 1.00, based largely upon the internationally adopted ISO/EEC 13213 (ANSI/IEEE 1212) CSR Architecture Specification and the IEEE 1394-1995 Serial Bus Specification, the entire writing of which is hereby incorporated by reference. One or more digital devices 184, such as DVDs, digital camera or digital video cameras are in communication with high-performance serial bus 182.

Figure 2:
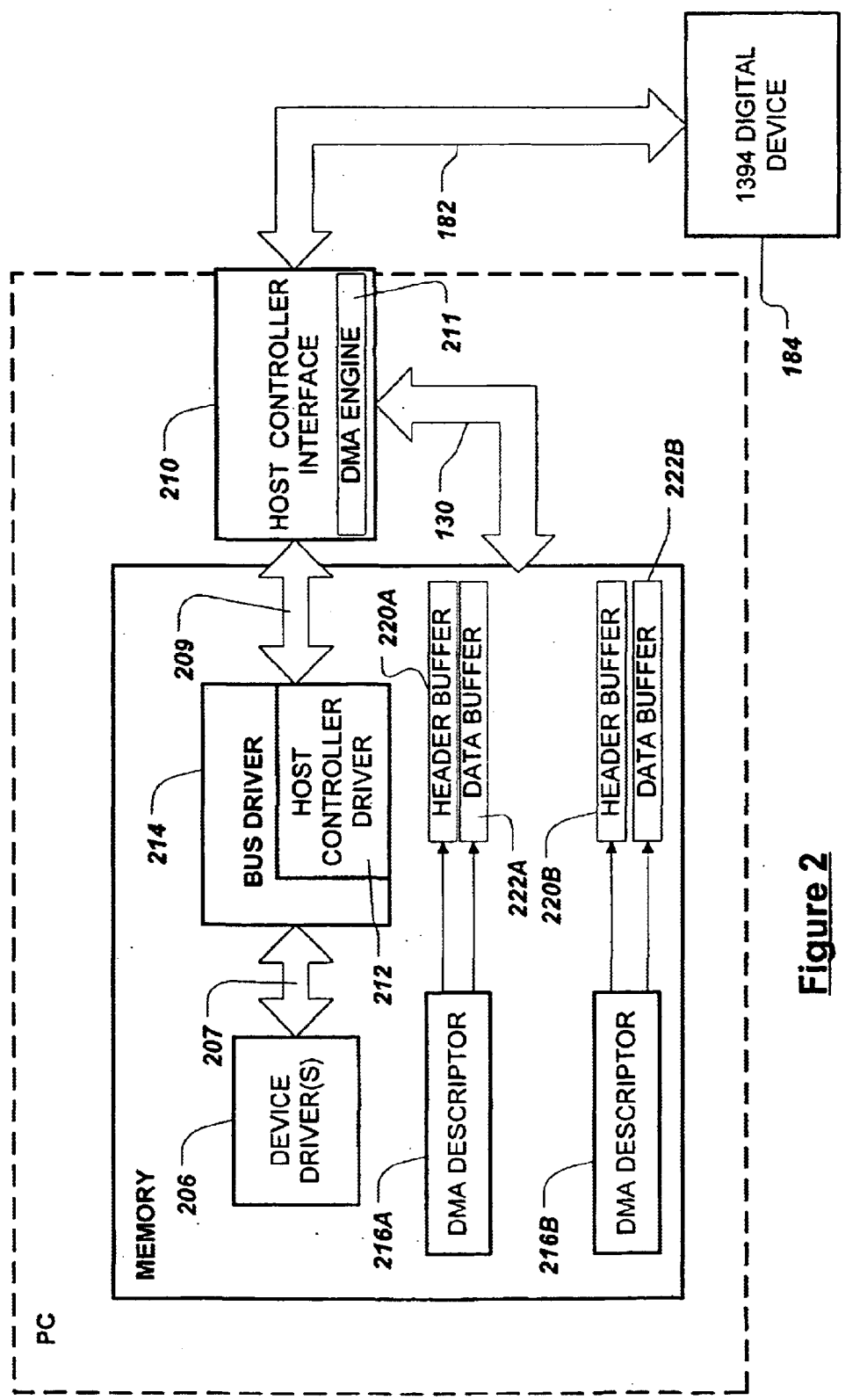
FIG. 2 illustrates an exemplary controller and DMA context according to the invention.

FIG. 2 illustrates an exemplary software driver stack and hardware configuration that may be used to implement the present invention. In particular, the exemplary protocol stack comprises an IEEE 1394-compliant host controller 210, which is adapted to bridge the protocol gap between the PCI bus 130 and the high-performance serial bus 182 and which includes a DMA engine 211. Particular implementations of the host controller 210 may include a 1394 Open Host Controller Interface (OCHI) complying with the "1394 Open Host Controller Interface Specification" Release 1.00 of Oct. 20, 1997, the subject matter and entire writing of which is hereby incorporated by reference.

In an IEEE 1394 implementation, an exemplary buffering system according to the invention will utilize Descriptor-Based Direct Memory Access (DB-DMA). According to such an implementation, bus driver 214 and host controller driver 212 are modified according to the invention to create appropriate DMA descriptors 216 in host memory. For example, the device driver 206 may implement creation of the DMA descriptors 216 using a structure similar to the ISOCH_DESCRIPTOR structure defined by the MICROSOFT WINDOWS Driver Development Kit, but modified to create DMA descriptors 216 as will be described below An exemplary driver stack for implementing the invention comprises one or more device drivers 206 which are loaded on top of a bus driver 214, which, in turn sits on top of the host controller driver 212. Each of device driver 206, bus driver 214 and host controller driver 212 is a software component resident in host memory. One or more device driver interfaces 207 are provided between the device drivers 207 and the bus driver 214. Similarly, a bus driver interface 209 is provided between the bus driver and the host controller 210. The interfaces 207 and 209 define the types of data that may be exchanged between drivers as well as the sequence of exchanges.

Host controller driver 212 is essentially a software component that provides a hardware-independent interface to the high-performance serial bus 182 and controls the hardware that implements the host controller interface 210. Host controller driver 212 is adapted to cooperate with the hardware interface and controller registers, for example, present in the host controller interface 210. In the case of an implementation of the invention in the IEEE 1394-compliant context, host controller driver 212 may be implemented using a version of the "ohci1394.sys" driver provided by Microsoft Corporation of Redmond, Wash., modified in accordance with the invention.

Bus driver 214 is implemented as a part of the operating system and exposes the functionality of the high-performance bus 182. Bus driver 214 is preferably implemented in the form of an Application Programming Interface (API) in the WINDOWS operating environment. Bus driver 214 is adapted to receive instructions from device driver(s) 206 which interface with one or more requesting applications being executed on host computer 100. In the case of an implementation of the invention in a IEEE 1394-compliant context, bus driver 214 may be implemented using a bus driver having the basic functionality of the "1394bus.sys" driver provided in the WINDOWS 98 and WINDOWS 2000 operating systems developed by Microsoft Corporation of Redmond, Wash.

Device driver 206 exposes the functionality of the particular digital device 184 that is transferring data to the host computer 100 via high-performance serial bus 182. Device driver 206 communicates to the digital device 184 by building Input/Output Request Packets (IRPs) and passes them to the bus driver 214 for processing. Because protocol-based buses are packet-oriented, communications between the IEEE 1394 client driver and the IEEE 1394 bus driver is handled by the I/O Request Block (IRB) attached to an IRP. In a typical isochronous transfer, the bus driver 214 and host controller driver 212 when receiving a request from device driver(s) 206 to receive isochronous data, accomplish various functions, including determining at run-time the maximum transfer speed between the digital device(s) 184 and the host computer 100, reserving bandwidth on the high-performance serial bus 182, allocating a channel for the isochronous transfer of data, allocating a resource handle to specify the channel, specify how incoming data may be copied into data buffers, and attaching buffers to the resource handle associated with a particular channel. When the bus driver 214 allocates a resource handle, it attaches buffers to the handle. The host controller DMA engine 211 will write data to the attached buffers.

Figure 3:
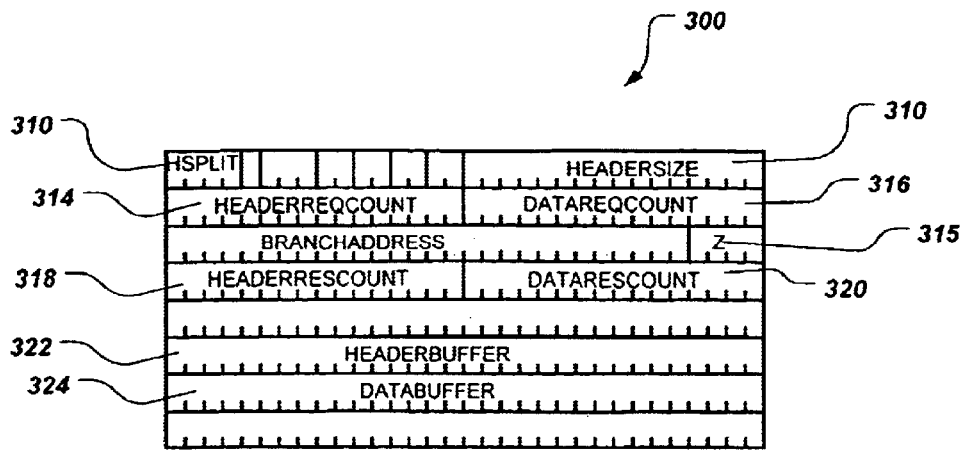
FIG. 3 illustrates an exemplary DMA descriptor according to the invention.

Referring additionally to FIG. 3, an exemplary format for a DMA descriptor according to the invention includes an 8-quadlet structure with various fields as described in the following Table:

| PARAMETER | DESCRIPTION |
|---|---|
| HSPLIT (310) | A four-bit word recognized by the host controller as designating a descriptor according to the invention. |
| HEADERSIZE (312) | Specifies the fixed length in bytes of the header information in each packet. |
| HEADERREQCOUNT (314) | Specifies the requested number of bytes to be placed in the header buffer |
| DATAREQCOUNT (316) | Specifies the requested number of bytes to be placed in the data buffer. |
| Z (315) | Specifies the number of descriptors in the next DMA descriptor block. "0" indicates no more blocks; "2" indicates that an HSPLIT descriptor is in the next block. |
| BRANCHADDRESS (317) | Specifies the address of the next DMA descriptor block (unless Z = 0) |
| HEADERRESCOUNT (318) | Specifies the number of bytes in the header buffer which are not occupied. This value is initialized by setting it equal to HEADERREQCOUNT before data is written to the buffer. |
| DATARESCOUNT (320) | Specifies the number of bytes in the payload data buffer which are not occupied. This value is initialized by setting it equal to DATAREQCOUNT before data is written to the payload data buffer. |
| HEADERBUFFER (322) | Specifies the physical address of the start of the header buffer. |
| DATABUFFER (324) | Specifies the physical address of the start of the data buffer. |

The DMA descriptors 216A and 216B are representative of a number of such descriptors that may be stored in host memory as a result of the operation of bus driver 214 and host controller driver 212. DMA descriptors 216A and 216B can therefore be scanned by the DMA engine 211 of the host controller 210. The last DMA Descriptor in a block contains the address of the next block as well as a count of the number of descriptors contained in the next block. Those of ordinary skill will recognize that the above format is only exemplary and that there are other ways to specify to the DMA engine the format of the descriptor. Moreover, although the above descriptor format utilizes HSPLIT as a four-bit word recognized by the host controller as designating a descriptor according to the invention, it will be recognized that the HSPLIT field is not necessary to implement the invention as other ways of specifying to descriptor format to the DMA engine may be used.

Figure 4:
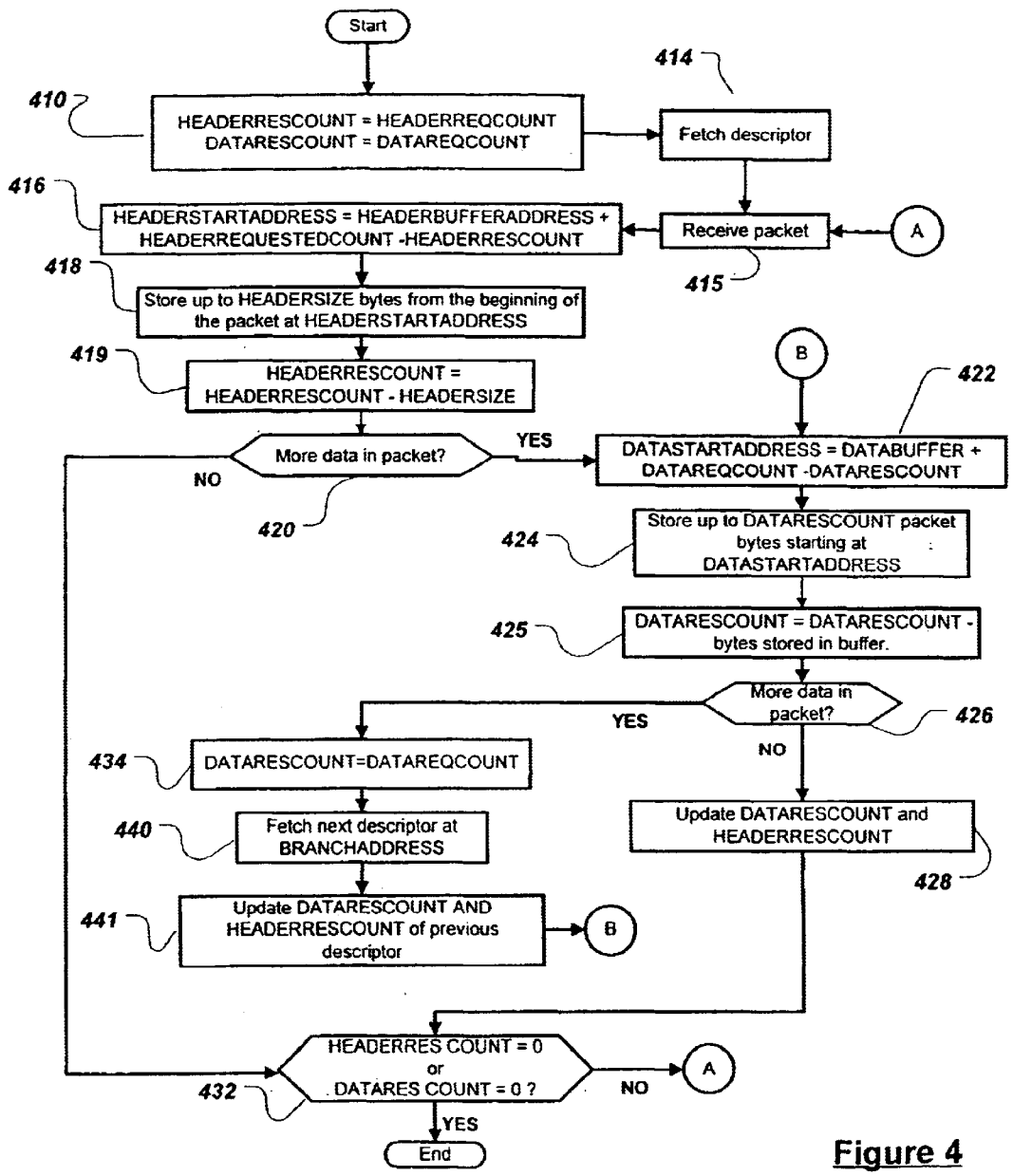
FIG. 4 illustrates a flow chart of a process for buffering data according to the invention.

FIG. 4 is a flow diagram of an exemplary process performed by host controller 210 under control of the DMA descriptors 216. Those of ordinary skill in the art will recognize that steps performed by the main processor have been omitted for clarity and that the depicted steps are performed by the DMA engine, which typically acts autonomously from the main processor.

At step 410, the host controller driver 212 initializes HEADERRESCOUNT equal to HEADERREQCOUNT and DATARESCOUNT equal to DATAREQCOUNT. Then, at step 414, the host controller 210 fetches the appropriate DMA descriptor from host memory. Since no data has yet been written to the header buffer 220A or the payload data buffer 222A, the residual count for each of these buffers is equal to the requested number of bytes to be placed by the DMA host controller. A packet is then received at step 415.

The process then continues at step 416, where the header buffer start address, HEADERSTARTADDRESS is calculated. Since HEADERREQCOUNT and HEADERRESCOUNT are equal for an empty buffer, HEADERSTARTADDRESS will initially be equal to the address HEADERBUFFER contained in DMA descriptor 216A. At step 418, the host controller 210 will store up to HEADERSIZE bytes from the packet beginning at HEADERSTARTADDRESS. At step 419, the residual count of the header buffer, HEADERRESCOUNT is updated to reflect the addition of a header of size HEADERSIZE into the header buffer 220A. It will be recognized by those of ordinary skill that in a typical implementation, the new value of HEADERRESCOUNT must not be stored until the entire packet has been stored in memory an any subsequent descriptor's DATARESCOUNTs are updated. In addition, the DATARESCOUNT of the current descriptor must be updated atomically with HEADERRESCOUNT. These steps have been omitted for clarity, since the illustrated flowchart assumes that the main processor does not run between steps 416 and 432, inclusive.

A determination is then made at step 420 as to whether or not more data exists in the packet, i.e., whether or not the packet contains only header data. If more data exists in the packet, the process branches to steps 422–425 to store the payload data in the data buffer 222A. If no data exists in the packet, i.e., there is only header information in the packet, the process proceeds to step 432, where a determination is made as to whether or not HEADERRESCOUNT or DATARESCOUNT equal zero, indicating either a full header buffer or a full data buffer. If a full header or data buffer is detected, the process terminates.

If at step 420, it is determined that the packet does contain additional data, the start address for the data buffer, DATASTARTADDRESS is calculated at step 422. As is the case for the initial write to the header buffer 220A, the initial write of data to the data buffer begins at the address DATABUFFER, since DATAREQCOUNT and DATARESCOUNT are equal. At step 424, the host controller 210 stores up to DATARESCOUNT packet bytes of data to the data buffer 222A beginning at DATASTARTADDRESS. At step 425, the residual count of the data buffer, DATARESCOUNT, is updated to reflect the addition of data to the data buffer. In a typical implementation, the new value of DATARESCOUNT for the descriptor fetched in step 414 must not be stored until all of the packet data have been stored in memory. In addition, DATARESCOUNT and HEADERRESCOUNT for the descriptor fetched in step 414 must be updated in a single atomic operation and after additional descriptors' DATARESCOUNTs have been updated in the case of overflow into another buffer. At step 426, a determination is made as to whether or not more data exists in the packet, i.e., whether or not the data in the packet must be carried over into another buffer. If no additional data exists in the packet, the process branches to step 428 where the DATARESCOUNT and HEADERRESCOUNT for the descriptor fetched in step 414 are updated. The process then continues to step 432. If, at step 432, it is determined that neither the header buffer nor the data buffer is full, the process branches back to step 415, where the next packet is received. In this iteration, at step 416, HEADERRES- COUNT will be set to a value representing the space remaining in the header buffer and thus, HEADERSTARTADDRESS will be updated to a new value to store the next header, at step 418, just after the previous header stored in the header buffer. At step 419, HEADERRESCOUNT is updated. At step 420, if it is determined that payload data exists in the current packet, the process determines the new DATASTARTADDRESS at step 422 and stores up to DATARESCOUNT bytes in the data buffer, contiguous with the payload data stored from the previous packet. If no additional data exists in the packet, at step 426 the process continues on to update the values of HEADERRESCOUNT AND DATARESCOUNT at step 428.

If at step 426, a determination is made that more data does exist in the packet after DATARESCOUNT packet bytes have been written to the data buffer at step 424, the process will continue writing payload data from the current packet to a new buffer defined by the next DMA descriptor. At step 434, the new descriptor block's residual data count is initialized as DATARESCOUNT in the descriptor 216B is initialized to a value equal to DATAREQCOUNT. At step 440, the next descriptor 216B located at the BRANCHADDRESS specified in the first descriptor 216A is fetched by the host controller 210. Then, At step 441, the previous descriptor block's (fetched in step 414) DATARESCOUNT and HEADERRESCOUNT are updated. In a typical implementation, this step must be done after all data are stored in memory and subsequent DATARESCOUNTs are updated. The process then branches back to step 422, where the new DATASTARTADDRESS is determined and then, at step 424, up to DATARESCOUNT packet data bytes are stored starting at DATASTARTADDRESS. At step 425, the residual count in the payload data buffer, DATARESCOUNT is updated and the process again, at step 426, determines if more data exists in the packet.

If no more data exists in the packet, the process branches to step 432 where it is determined if the residual count of the header buffer or the residual count of the data buffer equal zero. This is done by examining the values of HEADERRESCOUNT and DATARESCOUNT for the descriptor fetched in step 414. If so, the process terminates since the either the header buffer or the data buffer are filled. If, on the other hand, neither the header buffer nor the payload data buffer are full, the process branches to step 415 where another packet is received and processed according to the aforedescribed routine.

The process depicted in FIG. 4, for clarity, excludes process steps associated with error detection and correction. According to known isochronous transfer techniques, if an error is detected, typically, the values DATARESCOUNT and or HEADERRESCOUNT are not updated, so that erroneous or missing data is written over in host memory.

Figure 5:
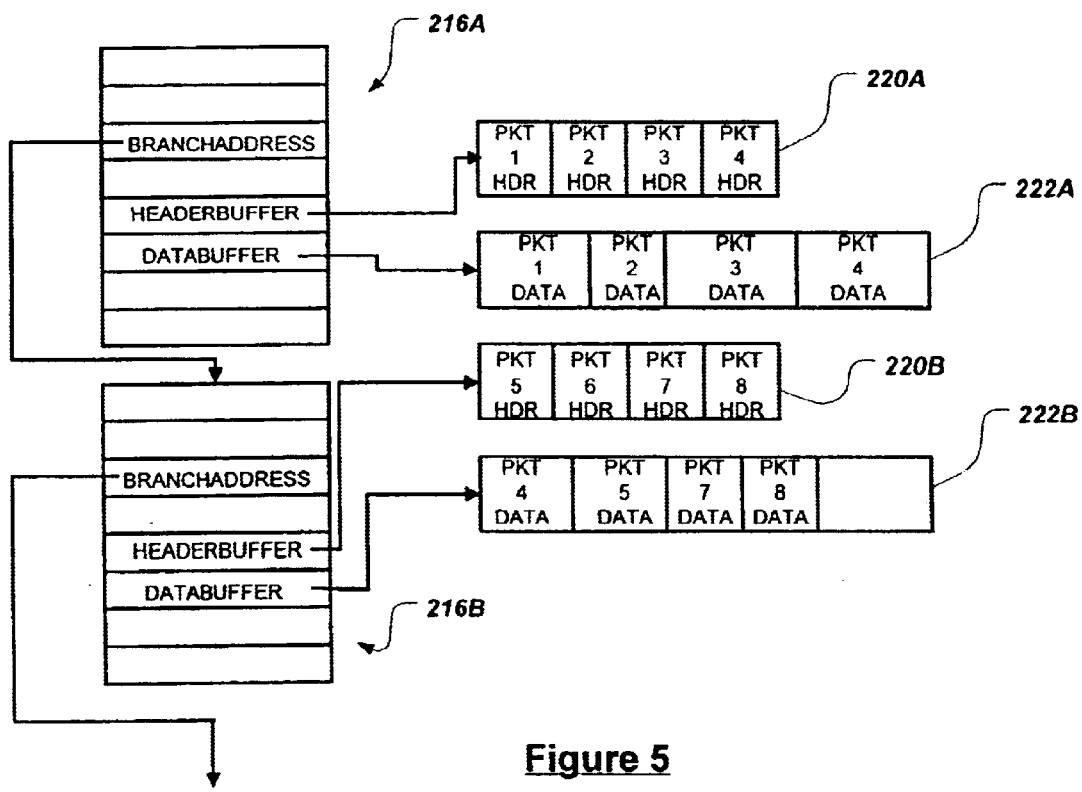
FIG. 5 illustrates an exemplary buffering scheme according to the invention.

FIG. 5 illustrates an exemplary buffering scheme accomplished by the host controller 210 operating according to the general process depicted in FIG. 4. Two DMA descriptors 216A and 216B each define respective buffer pairs: descriptor 216A defines and includes pointers to header buffer 220A and data buffer 222A; descriptor 216B describes and includes pointers to header buffer 220B and data buffer 222B.

As a result of the process illustrated in FIG. 4, incoming fixed-length packet headers "PKT 1 HDR" etc., are stored contiguously in header buffers 220A and 220B. Moreover, incoming variable-length payload data "PKT 1 DATA" etc. is stored contiguously in payload data buffers 222A and 222B. As will be apparent from FIG. 5, payload data from the fourth packet "PKT 4 DATA" abridges payload data buffers 222A and 222B. Moreover, there is no payload data associated with the sixth packet which only contains header information. As such, the payload data from the fifth and seventh packets is stored contiguously in payload data buffer 222B.

As will be apparent to those of ordinary skill, the invention provides for the direct creation of two logical buffers from a single logical, variable-length data stream. The exemplary buffering apparatus and method provide for direct buffering of header and payload data into separate buffers in host memory without the need for memory copies and parsing that involves the main processing unit of the host computer. Since both header data and payload data are stored contiguously in host memory, the correspondence between header data and payload data is maintained, even though the header and payload data are stored in separate logical buffers.

Although an exemplary process and apparatus according to the invention have been described above, it should be appreciated that a variety of modifications will be readily available to persons utilizing the invention. The foregoing description is not intended to be limiting, but is merely illustrative of an exemplary adaptation of the invention. Other products, apparatus and methods which incorporate modifications or changes to that which has been described herein are equally included within this application.

What is claimed is:

1. A method of buffering incoming data from a serial bus in a host computer system having memory and an interface with the serial bus, the serial bus conveying at least one logical data stream in packets, each packet representing header data and payload data, the method comprising the steps of directly storing the header data contiguously in a first buffer in the memory;

directly storing the payload data contiguously in a second buffer in the memory;

providing a DMA engine;

defining at least one descriptor in host memory, the descriptor block including a payload data buffer start address and a header buffer start address;

controlling the DMA engine based on the descriptor, wherein the step of directly storing the header data comprises the step of directing the header data from at least one incoming packet into the memory associated with the header buffer start address by the DMA engine and wherein the step of directly storing the payload data comprises the step of directing the payload data from at least one incoming packet into memory associated with the payload data buffer start address by the DMA engine.

2. A method of buffering incoming data from a serial bus in a host computer system having memory and an interface with the serial bus, the serial bus conveying at least one logical data stream in packets, each packet representing header data and payload data, the method comprising the steps of directly storing the header data contiguously in a first buffer in the memory;

directly storing the payload data contiguously in a second buffer in the memory; and defining in the memory at least one descriptor block for instructing the direct memory access engine to store the incoming payload data in the second buffer, wherein the storing steps further comprise the step of utilizing a direct memory access engine.

3. The method of claim 2, wherein the at least one descriptor block is an IEEE-1394-compliant descriptor block.

4. The method of claim 2, wherein the step of defining the at least one descriptor block includes the further step of providing a header buffer start address and a payload data buffer start address.

5. The method of claim 2 wherein the step of defining the at least one descriptor block includes the further step of providing a branch address to another descriptor block.

6. A method of buffering incoming data from a serial bus in a host computer system having memory and an interface with the serial bus, the serial bus conveying at least one logical data stream in packets, each packet representing header data and payload data, the method comprising the steps of directly storing the header data contiguously in a first buffer in the memory; and directly storing the payload data contiguously in a second buffer in the memory, wherein the serial bus is an IEEE 1394-compliant serial bus.

7. An apparatus for buffering an incoming logical stream of data, the stream including data packets having header data and payload data, the apparatus comprising:

a host computer having host memory and a host controller for receiving the incoming data, the host controller including a DMA engine for directly storing the incoming data in host memory;

a driver for controlling the DMA engine such that the header data and the payload data of the logical data stream are stored directly and contiguously in a header data buffer and a payload data buffer, respectively.

8. The apparatus of claim 7, wherein the DMA engine is controlled according to at least one descriptor created by the driver in host memory.

9. The apparatus of claim 8, wherein the at least one descriptor includes information representing the header buffer in the host memory and the payload data buffer in the host memory.

10. The apparatus of claim 8, wherein the at least one descriptor includes information representing a branch address to another of said at least one descriptors.

11. The apparatus of claim 8, wherein the at least one descriptor includes information representing a residual space in the payload data buffer and a residual space in the header data buffer.

12. The apparatus of claim 8, wherein the DMA engine is IEEE-1394 compliant.

13. A computer-readable medium having stored thereon a descriptor structure for defining a first buffer for storing header data in a logical data stream and a second buffer for storing payload data in the logical data stream, the descriptor structure comprising:

a first data field representing a header buffer starting address for storing the header data; and a second data field representing a payload data buffer starting address for storing the payload data.

14. The computer-readable medium of claim 13, further comprising a third data field representing a residual space remaining in the header buffer.

15. The computer-readable medium of claim 14, further comprising a fourth data field representing a residual space remaining in the payload data buffer.

16. The computer-readable medium of claim 15, further comprising a fifth data field representing a branch address to a second descriptor stored in the computer-readable medium.

17. A method of storing data in a logical data stream in two separate logical buffers, the data stream including data packets, each having a header and payload data, the method comprising the steps of:

receiving a first one of the packets using a DMA host controller;

directly storing the payload data in the first one of the packets in a first buffer and storing the header data in the first one of the packets in a second buffer;

receiving a second one of the packets; and directly storing the payload data in the second one of the packets in the first buffer, contiguously with the payload data in the first one of the packets.

18. The method of claim 17, wherein the DMA host controller is IEEE 1394-compliant.

19. The method of claim 17, further comprising the step of defining in the memory at least one descriptor block for instructing the DMA host controller to store the payload data in the first buffer.

20. The method of claim 19, wherein the at least one descriptor block is IEEE-1394-compliant.

21. The method of claim 19, wherein the step of defining the at least one descriptor block includes the further step of providing a header buffer start address and a payload data buffer start address.

22. The method of claim 19, wherein the step of defining the at least one descriptor block includes the further step of providing a branch address to another descriptor block.

* * * * *